(12) United States Patent
Paul et al.

(10) Patent No.: US 7,969,939 B2
(45) Date of Patent: Jun. 28, 2011

(54) MEASURING SIGNAL QUALITY

(75) Inventors: Isaac Paul, Brunswick (AU); Wang Xinhua, Glen Waverley (AU)

(73) Assignee: NEC Corporation, Tokyo (JP)

( * ) Notice: Subject to any disclaimer, the term of this patent is extended or adjusted under 35 U.S.C. 154(b) by 916 days.

(21) Appl. No.: 11/816,739

(22) PCT Filed: Feb. 21, 2006

(86) PCT No.: PCT/JP2006/303525
§ 371 (c)(1),
(2), (4) Date: Sep. 20, 2007

(87) PCT Pub. No.: WO2006/088259
PCT Pub. Date: Aug. 24, 2006

(65) Prior Publication Data
US 2009/0023439 A1    Jan. 22, 2009

(30) Foreign Application Priority Data

Feb. 21, 2005 (AU) ................................ 2005900792
Feb. 16, 2006 (AU) ................................ 2006200651

(51) Int. Cl.
*H04W 4/00* (2009.01)
(52) U.S. Cl. ...................... 370/329; 455/423; 455/550.1
(58) Field of Classification Search .................. 370/328, 370/329, 332, 335, 342, 349; 455/63.1, 67.11, 455/67.13, 62, 522, 509, 513, 423–425, 450, 452.1, 452.2, 550.1, 556.2, 561
See application file for complete search history.

(56) References Cited

U.S. PATENT DOCUMENTS

| | | | | |
|---|---|---|---|---|
| 2002/0193133 A1* | 12/2002 | Shibutani | ...................... | 455/522 |
| 2004/0072577 A1* | 4/2004 | Myllymaki et al. | ........ | 455/456.1 |
| 2004/0259584 A1* | 12/2004 | Murata et al. | .................. | 455/522 |
| 2005/0138671 A1* | 6/2005 | Love et al. | ..................... | 725/123 |

FOREIGN PATENT DOCUMENTS

| | | |
|---|---|---|
| EP | 1337054 A2 | 8/2003 |
| JP | 2003-032168 A | 1/2003 |
| JP | 2003-244058 A | 8/2003 |
| JP | 2005-006190 A | 1/2005 |
| JP | 2005-012386 A | 1/2005 |
| JP | 2006-013915 A | 1/2006 |

* cited by examiner

*Primary Examiner* — Kent Chang
*Assistant Examiner* — Dinh P Nguyen
(74) *Attorney, Agent, or Firm* — Dickstein Shapiro LLP

(57) ABSTRACT

There is disclosed method of measuring a received signal quality in a wireless telecommunications network. The method includes determining at least two signal parameters on the basis of measurements made on at least one of a plurality of physical channels, determining a calibration parameter indicative of variations common to the signal parameters, and determining the signal quality parameter on the basis of said at least one measured signal parameter and said calibration parameter.

19 Claims, 3 Drawing Sheets

MEASURING SIGNAL QUALITY

TECHNICAL FIELD

The present invention relates broadly to measurements of received signal quality in a wireless telecommunications network. The preferred embodiment provides a method for determining the signal to interference ratio (SIR) in a wireless telecommunications network.

BACKGROUND ART

Received signal quality or strength can be critical for system performances in a mobile terminal of a wireless telecommunications network. In particular the accuracy of the measurements of signal quality or strength can be critical in a system which implements closed loop power control (also known as inner loop power control) to control the power of the transmitted signal from the network to the mobile terminal, such as a wideband code division multiple access (WCDMA) system.

In the description of the preferred embodiments of the present specification the terms received signal code power (RSCP) and interference signal code power (ISCP) will be used to refer to the RSCP and ISCP values calculated from the received symbols.

FIG. 1 depicts a base station 10 in communication with a mobile terminal 12. In this example the base station 10 is transmitting a signal 14 in the downlink direction to the mobile terminal 12. The downlink physical channels include a common pilot channel (CPICH) and downlink dedicated physical control channel (DL DPCH). The signal to interference ratio (SIR) of the radio link 14 between the base station 10 and the mobile terminal 12 can be calculated as the RSCP divided by the ISCP. In most systems, however, the ISCP measurements typically have very high variation, which can lead to poor power control performance. The largest source of this variation is typically the sampling error because of the small number of symbols available for each calculation. Much less of the variation of the measured ISCP is due to true variations of the ISCP.

To reduce the variation of the ISCP caused by the sampling error, and to thereby improve the accuracy of SIR measurements, when calculating the SIR in mobile terminal, the ISCP will typically be smoothed, for example, with an Infinite Impulse Response (IIR), or any other low pass filter. This smoothed ISCP (Smoothed_ISCP$_t$) can be calculated as follows:

Smoothed_ISCP$_t$=λ·Smoothed_ISCP$_{t-1}$+(1−λ)·ISCP$_t$ and the Signal to Interference Ratio (SIR) can therefore be expressed as follows:

$$SIR = \frac{RSCP_t}{\text{Smoothed\_ISCP}_t}$$

where λ is a coefficient that determines how much smoothing is applied.

However, a problem can occur when there is a large component of common variation between the measured RSCP and ISCP. This problem arises because the smoothed ISCP lags the true ISCP, but the RSCP adjusts instantly, which causes an offset in the measured SIR. Thus there is a trade off between the benefits of smoothing the ISCP and the drawback of introducing an offset to SIR measurements. This trade off is particularly difficult to manage when the RSCP and ISCP change rapidly, e.g. fast fading conditions, and in these circumstances the performance of inner loop power control may be poor.

The inventor has determined that these problems can be addressed by reducing the amount of common variation between the RSCP and ISCP. More particularly, the inventor has determined in certain systems a reference that can be found which can be used to measure and/or remove the common variation of the measured RSCP and ISCP. In this case the SIR can be calculated as follows:

$$SIR = \frac{\frac{RSCP_t}{C_t}}{\text{Smoothed\_ISCP}_t},$$

where $$\text{Smoothed\_ISCP}_t = \lambda \cdot \text{Smoothed\_ISCP}_{t-1} + (1-\lambda) \cdot \frac{ISCP_t}{C_t} \text{ and}$$

$C_t$ is a reference for the component of common variation between the RSCP and the ISCP. Preferably this reference is not derived from the RSCP or the ISCP of the same channel.

SUMMARY

In a first aspect the present invention provides a method of determining a signal quality parameter for a signal received by a device operating in a wireless communications network, wherein the device receives a signal comprising a plurality of physical channels, said method including determining at least two signal parameters, on the basis of measurements made on at least one of said plurality of physical channels, determining a calibration parameter indicative of variations common to the signal parameters, and determining the signal quality parameter on the basis of said at least one measured signal parameter and said calibration parameter.

Preferably a calibration parameter is determined from a different channel of said plurality of physical channels to said signal parameters.

The method can additionally include, measuring a value related to the received signal strength and a value related to the received interference strength on one of said plurality of physical channels. Alternatively the method can additionally include, measuring a value related to the received signal strength on one of said plurality of physical channels and measuring a value related to the received interference strength on a second one of said plurality of physical channels.

Preferably the calibration parameter is determined on the basis of a measurement of either of, a value related to signal strength, or received interference strength on a channel of said plurality of channels which is not used for the measurement of either received signal strength or received interference strength.

In a particularly preferred embodiment the method is implemented to determine the SIR of a downlink of a wideband CDMA network. In this case, the method can include:

measuring an interference signal code power (ISCP) from a dedicated physical channel (DPCH);

measuring an received signal code power (RSCP) from the DPCH; and determining a calibration parameter from a measurement on a common pilot channel (CPICH) of the downlink.

Preferably the calibration parameter is the RSCP measured from the CPICH.

BRIEF DESCRIPTION OF DRAWINGS

Exemplary embodiments of the present invention will now be described by way of example only with reference to the accompanying drawings, in which.

EXEMPLARY EMBODIMENT

Figure 2:
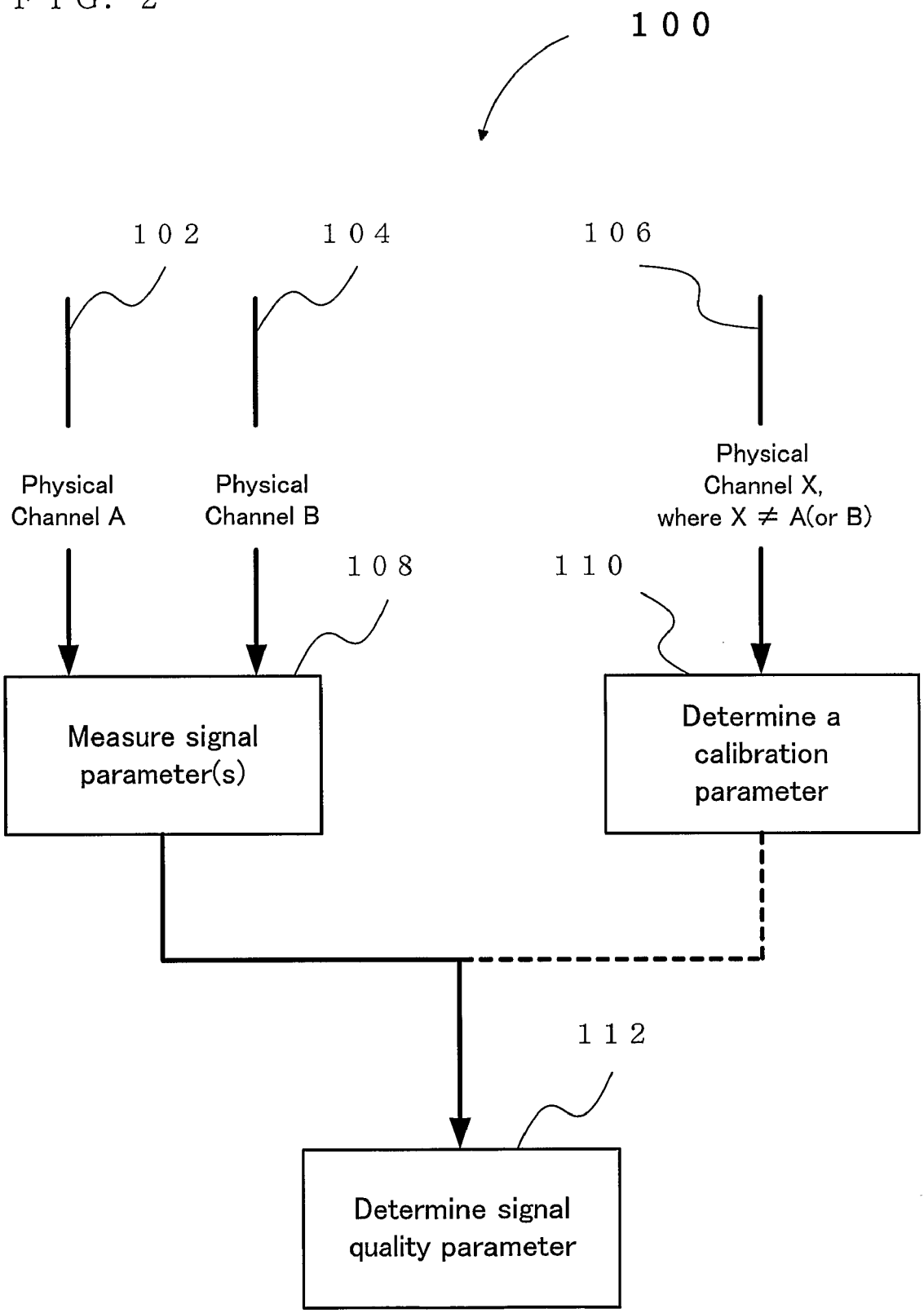
FIG. 2 depicts a highly schematic flowchart illustrating a process according to an embodiment of the present invention.

FIG. 2 depicts a flowchart illustrating a method 100 for determining a quality parameter for a received signal that can be implemented in a device operating in a wireless communications network. The received signal includes X physical channels, including physical channels A, B and X designated with reference numerals 102, 104 and 106 respectively.

The method 100 begins with the device measuring at least two signal parameters from the received downlink physical channels, at step 108. In this example all of the signal parameters can be measured on the same physical channel e.g. on channel A, 102; or they may be measured across a plurality of physical channels, e.g. some parameters can be measured on channel A 102 (such as the common pilot channel—CPICH of FIG. 1), and some parameters can be measured on channel B, 104 (such as the downlink dedicated physical control channel—DL DPCH of FIG. 1).

In step 110 a calibration parameter is also determined from a measurement of a physical channel. The physical channel from which the calibration parameter is derived is preferably not one of the physical channels from which the signal parameter(s) are measured in step 108. For clarity, in the present example, the calibration parameter is determined based on physical channel X.

In the case where all measurements of the signal parameters are made on physical channel A, then the calibration parameter could be determined on the basis of physical channel B. Alternatively if measurements of the signal parameters are made on physical channels A and B then it is preferable that the calibration parameter is determined on the basis of an entirely different physical channel, i.e. channel X. In an optimal implementation the calibration parameter measured on a physical channel is likely to share a variation component that is common to the physical channels on which the signal parameters measurements are made.

Next, in step 112, a signal quality parameter can be calculated based on the measured signal parameters and the calibration parameter that were determined in steps 108 and 110, respectively.

A detailed description of an embodiment of the present invention will now be given in connection with FIG. 3.

Figure 1:
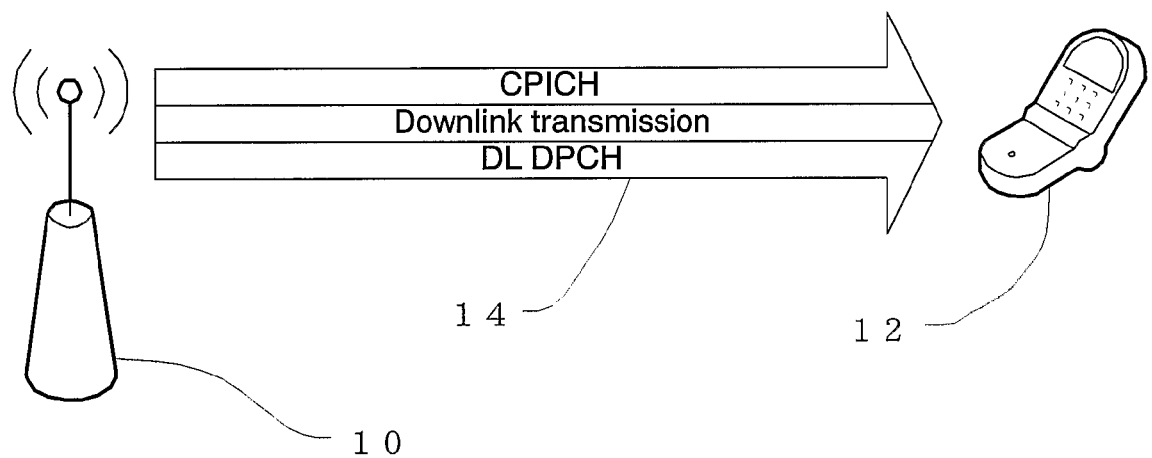
FIG. 1 depicts a highly schematic view a base station transmitting a signal in the downlink direction to a mobile terminal.
Figure 3:
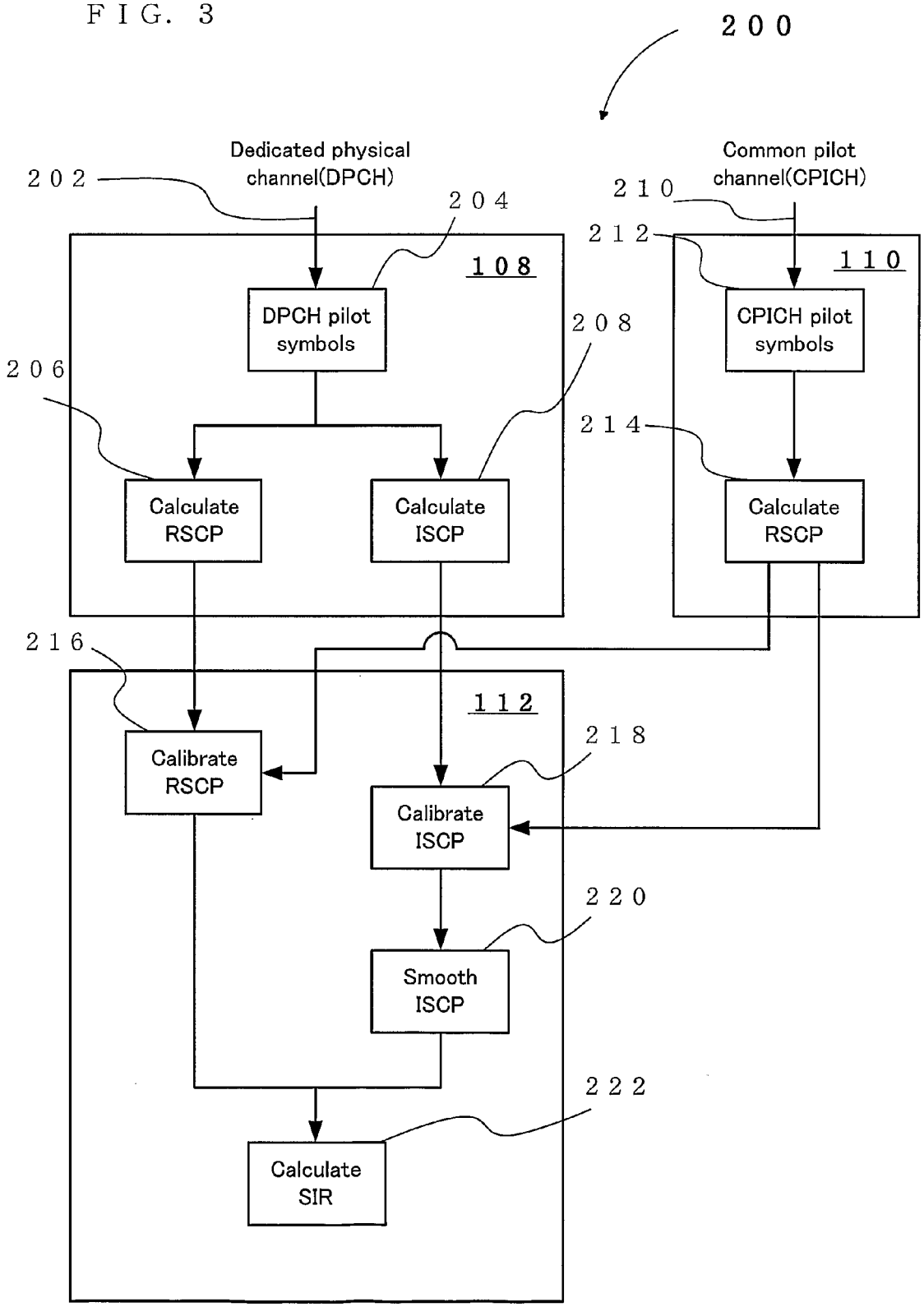
FIG. 3 depicts a more detailed flowchart depicting the details of an exemplary implementation of the process of FIG. 2.

FIG. 3 depicts a method used to calculate the signal to interference ratio (SIR) on a downlink signal received by a mobile terminal in a 3G wideband code division multiple access (W-CDMA) network, as illustrated FIG. 1.

In this embodiment the SIR is determined on the basis of received power measurements made on the pilot symbols of the dedicated physical channel (DPCH). The method 200 begins with the receiving and decoding of the DPCH pilot symbols from the received DPCH signal 202 at step 204. The received signal code power (RSCP) is calculated, in step 206, as the magnitude squared of the average of the symbols received, and the interference signal code power (ISCP) is calculated, in step 208, as the variance of the symbols received.

Since the ISCP is calculated from the DPCH pilot symbols, the common pilot channel (CPICH) is used to generate the calibration parameter. This is indicated by reference numeral 210 in FIG. 3. The CPICH pilot symbols are decoded at 212, and used to calculate the CPICH RSCP in step 214. The CPICH RSCP will be used as a reference for the component of common variation between the DPCH RSCP and DPCH ISCP.

The DPCH RSCP and DPCH ISCP are calibrated in steps 216 and 218 respectively. Calibration is conducted by dividing both the DPCH RSCP and the DPCH ISCP by the CPICH RSCP to remove most of the common variation.

Smoothing of the DPCH ISCP can then be conducted in step 220, using:

$$\text{Smoothed\_ISCP}_t = \lambda \cdot \text{Smoothed\_ISCP}_{t-1} + (1-\lambda) \cdot \frac{ISCP_t}{C_t}$$

where $C_t$ is the CPICH RSCP.

Finally, in step 222, the SIR for the downlink signal can be calculated, as described above using the following expression:

$$SIR = \frac{\frac{RSCP_t}{C_t}}{\text{Smoothed\_ISCP}_t}$$

In embodiments where the DPCH RSCP and DPCH ISCP for each antenna finger is calculated separately the DPCH RSCP and DPCH ISCP can be divided by the CPICH RSCP before combining fingers, and the resultant RSCP and ISCP values combined across fingers at a later stage. Alternatively, if the values are calculated for each radio link separately, the DPCH RSCP and DPCH ISCP can be divided by the CPICH RSCP before combining and the resultant RSCP and ISCP values combined across radio links at a later stage. It is also possible for the DPCH RSCP and DPCH ISCP to be divided by the CPICH RSCP after combining all of the radio links in the active set.

In embodiments where the despread DPCH pilot symbols are multiplied by the amplitude of the CPICH channel estimates in the equalisation process, this extra component of the RSCP and ISCP can be removed by using the CPICH RSCP squared as the calibration parameter, as opposed to simply using the CPICH RSCP in the original embodiment. Where the equalisation process does not alter the amplitude of the DPCH pilot symbols, and only applies phase correction, then the CPICH RSCP is used as the calibration parameter. The CPICH RSCP can be used as the calibration parameter in the cases where the RSCP and ISCP are calculated from unequalised DPCH symbols.

Using the CPICH RSCP as a reference for the common component of variation between the DPCH RSCP and the DPCH ISCP has been found to be particularly advantageous.

A large component of the DPCH ISCP is typically the interference from other channels and paths from the active set. Therefore, during a fade, when the CPICH RSCP and DPCH RSCP decrease, the DPCH ISCP is expected to decrease as well. However, if a large component of the DPCH ISCP is other noise then the DPCH ISCP will not decrease by as much. This expected correlation between the decrease in the CPICH RSCP and the DPCH RSCP makes the CPICH RSCP well suited for eliminating the common component of variation between the DPCH RSCP and the DPCH ISCP whilst not cancelling out genuine interference effects.

Automatic Gain Control (AGC) affects the DPCH RSCP, DPCH ISCP and CPICH RSCP values calculated from the received symbols. Changes in the AGC level will cause a proportional change to each of these three values. If the AGC could compensate for the changes to the DPCH and CPICH channel powers in fading conditions, then much of that source of variation in the RSCP and ISCP would be removed. However, in fast fading conditions, the AGC may be unable to track changes in the total received signal level. If a significant component of the received signal strength indicator (RSSI) is not due to cells in the active set, then the AGC will not compensate for all of the change of the CPICH RSCP, DPCH RSCP and DPCH ISCP, and the common component of variation will be strong.

The addition and deletion of fingers and radio links can also cause abrupt and similar changes to the DPCH RSCP, DPCH ISCP and CPICH RSCP values calculated from symbols that have been combined across fingers and radio links. Therefore, changes to the DPCH RSCP and DPCH ISCP will be common to the CPICH RSCP, making the CPICH RSCP the preferred calibration parameter of use in removing the common component of variation between the DPCH RSCP and the DPCH ISCP.

In alternative embodiments the ISCP can be calculated from the CPICH symbols. In this case another calibration parameter for the common variation between the DPCH RSCP and the CPICH ISCP may be more suitable than the CPICH RSCP, depending on implementation details.

Implementation of the preferred embodiment can lead to a reduction of the lag of the smoothed ISCP and the corresponding SIR measurement error. As a result, the smoothing of the ISCP can be increased to further reduce the sampling error without introducing much additional lag to the smoothed ISCP.

It will be understood that the invention disclosed and defined in this specification extends to all alternative combinations of two or more of the individual features mentioned or evident from the text or drawings. All of these different combinations constitute various alternative aspects of the invention.

INCORPORATION BY REFERENCE

This application is based upon and claims the benefit of priority from Australian Patent Application No. 2005900792 filed on Feb. 21, 2005 and No. 2006200651 filed on Feb. 16, 2006, the disclosure of which is incorporated herein in its entirety by reference.

The invention claimed is:

1. A method of determining a signal quality parameter for a signal received by a device operating in a wireless communications network, wherein the device receives a signal comprising a plurality of physical channels, said method including:
   determining two signal parameters, on the basis of measurements made on at least one of said plurality of physical channels;
   determining a calibration parameter indicative of variations common to the signal parameters; and
   determining the signal quality parameter on the basis of said two signal parameters and said calibration parameter,
   wherein said two parameters are an interference signal code power (ISCP) and a received signal code power (RSCP),
   wherein said calibration parameter is the RSCP determined from a different channel of said plurality of physical channels to said two signal parameters, and
   in said step of determining the signal quality parameter, dividing both the RSCP and the ISCP by the calibration parameter to remove most of the common variation, smoothing the ISCP, and calculating the signal quality parameter by using the following expression:

$$SIR = \frac{\frac{RSCP_t}{C_t}}{Smoothed\_ISCP_t}$$

where SIR is the signal quality parameter, Smoothed ISCP$_t$ is the smoothed ISCP, and C$_t$ is the calibration parameter.

2. A method of determining a signal quality parameter as claimed in claim 1 wherein the method includes:
   measuring the RSCP and the ISCP on one of said plurality of physical channels.

3. A method of determining a signal quality parameter as claimed in claim 1 wherein the method includes:
   measuring the RSCP on one of said plurality of physical channels and measuring the ISCP on a second one of said plurality of physical channels.

4. A method of determining a signal quality parameter as claimed in claim 1, wherein the calibration parameter is determined on the basis of a measurement of the RSCP on a channel of said plurality of channels which is not used for the measurement of the RSCP and the ISCP.

5. A method of determining a signal quality parameter as claimed claim 1, which is used to determine the signal to interference ratio (SIR) of a downlink of a wideband CDMA network.

6. A method of determining a signal quality parameter as claimed in claim 4, which further includes:
   measuring the ISCP from a dedicated physical channel (DPCH);
   measuring the RSCP from the DPCH; and
   determining said calibration parameter from a measurement on a common pilot channel (CPICH) of the downlink.

7. A method of determining a signal quality parameter as claimed in claim 6, wherein the calibration parameter is the RSCP measured from the CPICH.

8. A mobile terminal configured to receive a signal comprising a plurality of physical channels from a wireless communications network, said mobile terminal being further configured to determine a signal quality parameter for the received signal using the method as recited in claim 1.

9. A method of determining a signal quality parameter as claimed in claim 2, wherein the calibration parameter is determined on the basis of a measurement of the RSCP on a channel of said plurality of channels which is not used for the measurement of the RSCP and the ISCP.

10. A method of determining a signal quality parameter as claimed in claim 3, wherein the calibration parameter is determined on the basis of a measurement of the RSCP on a channel of said plurality of channels which is not used for the measurement of the RSCP and the ISCP.

11. A method of determining a signal quality parameter as claimed in claim 2, which is used to determine the signal to interference ratio (SIR) of a downlink of a wideband CDMA network.

12. A method of determining a signal quality parameter as claimed in claim 3, which is used to determine the signal to interference ratio (SIR) of a downlink of a wideband CDMA network.

13. A method of determining a signal quality parameter as claimed in claim 4, which is used to determine the signal to interference ratio (SIR) of a downlink of a wideband CDMA network.

14. A mobile terminal configured to receive a signal comprising a plurality of physical channels from a wireless communications network, said mobile terminal being further configured to determine a signal quality parameter for the received signal using the method as recited in claim 2.

15. A mobile terminal configured to receive a signal comprising a plurality of physical channels from a wireless communications network, said mobile terminal being further configured to determine a signal quality parameter for the received signal using the method as recited in claim 3.

16. A mobile terminal configured to receive a signal comprising a plurality of physical channels from a wireless communications network, said mobile terminal being further configured to determine a signal quality parameter for the received signal using the method as recited in claim 4.

17. A mobile terminal configured to receive a signal comprising a plurality of physical channels from a wireless communications network, said mobile terminal being further configured to determine a signal quality parameter for the received signal using the method as recited in claim 5.

18. A mobile terminal configured to receive a signal comprising a plurality of physical channels from a wireless communications network, said mobile terminal being further configured to determine a signal quality parameter for the received signal using the method as recited in claim 6.

19. A mobile terminal configured to receive a signal comprising a plurality of physical channels from a wireless communications network, said mobile terminal being further configured to determine a signal quality parameter for the received signal using the method as recited in claim 7.

* * * * *